United States Patent
Vernooy

(10) Patent No.: US 7,442,816 B2
(45) Date of Patent: Oct. 28, 2008

(54) ANTIMONY VANADIUM PHOSPHATE

(75) Inventor: Paul Douglas Vernooy, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 437 days.

(21) Appl. No.: 11/127,967

(22) Filed: May 12, 2005

(65) Prior Publication Data

US 2005/0287060 A1    Dec. 29, 2005

Related U.S. Application Data

(60) Provisional application No. 60/570,555, filed on May 13, 2004.

(51) Int. Cl.
C07D 307/02     (2006.01)
B01J 27/198     (2006.01)
C01B 25/16      (2006.01)

(52) U.S. Cl. .................. 549/505; 423/306; 423/659; 502/209; 549/260; 549/506

(58) Field of Classification Search .............. 423/306, 423/659; 502/209; 549/505, 506, 260
See application file for complete search history.

(56) References Cited

U.S. PATENT DOCUMENTS

| | | | |
|---|---|---|---|
| 3,419,607 A | 12/1968 | Hurst | |
| 3,579,573 A | 5/1971 | Dieter et al. | |
| 4,320,031 A * | 3/1982 | Parthasarathy et al. | 502/211 |
| 4,652,543 A * | 3/1987 | Edwards et al. | 502/209 |
| 4,699,895 A * | 10/1987 | Edwards | 502/209 |
| 4,732,885 A * | 3/1988 | Edwards et al. | 502/209 |
| 4,778,890 A | 10/1988 | Shimizu et al. | |
| 4,797,381 A * | 1/1989 | Bartek et al. | 502/202 |
| 5,254,722 A | 10/1993 | Peukert et al. | |
| 5,696,047 A * | 12/1997 | Bremer et al. | 502/209 |
| 6,586,361 B1 * | 7/2003 | Heidemann et al. | 502/353 |
| 6,903,047 B2 * | 6/2005 | Kourtakis et al. | 502/209 |
| 2004/0030172 A1 * | 2/2004 | Bogan, Jr. | 558/322 |

FOREIGN PATENT DOCUMENTS

| | | |
|---|---|---|
| EP | 1 136 120 A1 | 9/2001 |
| GB | 969 369 | 9/1964 |

OTHER PUBLICATIONS

International Search Report Dated Aug. 19, 2005, International Application No. PCT/US2005/017012, International Filing Date: May 12, 2005.

* cited by examiner

*Primary Examiner*—Wayne A. Langel

(57) ABSTRACT

A new composition, $SbVPO_{6+\delta}$, in which $0 \leq \delta \leq 1.5$, has been prepared. Crystals of the compound have been grown by several methods, and the crystal structure has been determined. It is related in structure to vanadyl pyrophosphate (VPO), an important selective oxidation catalyst. The compound has shown utility as an oxidation catalyst.

14 Claims, 2 Drawing Sheets

A single $V_2O_8$ moiety
(phosphate and antimony groups omitted for clarity)

A single V$_2$O$_8$ moiety
(phosphate and antimony groups omitted for clarity)

X-ray Powder Diffraction Pattern

ANTIMONY VANADIUM PHOSPHATE

This application claims the benefit of U.S. Provisional Application No. 60/570,555, filed May 13, 2004, which is incorporated in its entirety as a part hereof for all purposes.

FIELD OF THE INVENTION

This invention relates to a new antimony vanadium phosphorus oxide composition, which can be used as a catalyst.

BACKGROUND OF THE INVENTION

Vanadium phosphate (or VPO) catalysts are known in the art as useful catalysts for several commercial processes, especially oxidation reactions such as the oxidation of butane to maleic anhydride or related compounds. Many different distinct forms of VPO exist, with the best known being $(VO)_2P_2O_7$. The basic VPO crystalline structures can be modified with other metal cations either by doping, as solid solutions, or by substitution of V in the crystal structure. All of these modifications can lead to adjustments of catalytic properties.

Little work has been disclosed on VPO compositions containing antimony. U.S. Pat. Nos. 5,254,722 and 4,778,890 disclose $SbVP_3O_{12}$ and $VSb_2P_{0.85}O_{7.62}$, respectively.

SUMMARY OF THE INVENTION

This invention is directed in one aspect to a composition of the formula $SbVPO_{6+\delta}$ wherein $\delta$ is 0, or 0 or greater than 0 to about 1.5. In one embodiment, the lattice constants are about $a=7.999$ Å, $b=5.727$ Å, $c=11.566$ Å, and $\beta=93.97°$, and the composition is in a monoclinic crystal system, and is characterized by the X-ray data shown in Tables I-VI.

This invention is directed in another aspect to an oxidation reaction in which a substance to be oxidized is contacted with a composition of the formula $SbVPO_{6+\delta}$ wherein $\delta$ is 0, or 0 or greater than 0 to about 1.5, to produce an oxidized substance. In one embodiment, the substance to be oxidized is an acyclic unsaturated hydrocarbon having from 4 to 10 carbon atoms, and the process can be conducted in the presence of oxygen. In another embodiment the substance to be oxidized is butadiene, and furan is produced.

This invention is directed in a further aspect to a process for preparing an oxidized antimony vanadium phosphate composition by heating a starting composition of the formula $SbVPO_6$ in the presence of oxygen to produce a composition of the formula $SbVPO_{6+\delta}$ wherein $\delta$ is greater than 0 to about 1.5.

DETAILED DESCRIPTION OF THE INVENTION

A new composition of antimony vanadium phosphate, $SbVPO_6$, has been discovered with a unique crystalline structure. In this composition, the antimony is not a dopant but is rather an intrinsic part of the structure and thus participates in the determination of the crystallographic space group that is characteristic of the composition. The material can be further oxidized by heating in air or oxygen to form compositions of the formulae $SbVPO_{6+\delta}$ wherein $\delta$ can up to 1.5, or from greater than 0 up to about 1.5. In various other embodiments, $\delta$ can also be 0, greater than 0, or from 0 or greater than 0 up to about 1.1. The composition of this invention is useful as an oxidation catalyst.

Figure 2:
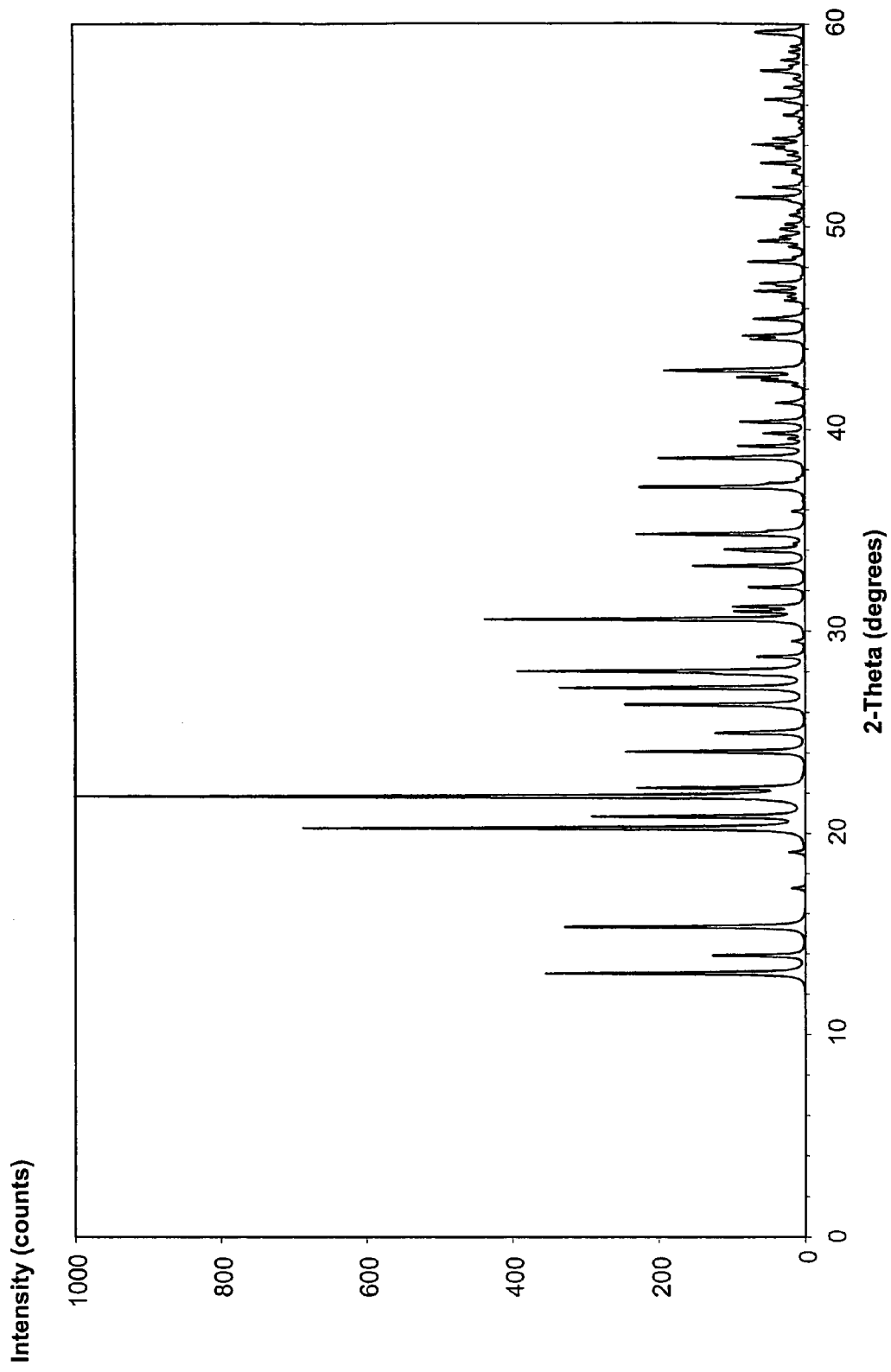
FIG. 2 is an X-ray powder diffraction pattern of $SbVPO_6$.

One embodiment of this invention provides a novel composition of the formula $SbVPO_6$. Crystals of this composition are dark green elongated bipyramids, and are air and water stable. The X-ray powder diffraction pattern of this composition is shown in FIG. 2. Single-crystal X-ray diffraction data for this composition are shown below in Tables I-VI:

Table I. Crystal Structure Parameters

Crystal System: Monoclinic
Lattice Parameters: $a=7.999(2)$ Å, $b=5.727(1)$ Å, $c=11.566(3)$ Å, $\beta=93.97(1)°$
Volume: 528.57 Å$^3$
Formula: $SbVPO_6$
Units/Cell: 4
Formula Weight: 299.6 amu
Density: 3.76 g/cc
Space Group: $P2_1/n$.

TABLE II

Fractional Coordinates (×10000) and Isotropic Thermal Parameters

| ATOM | X | Y | Z | $B_{ISO}$ |
|---|---|---|---|---|
| Sb(1) | 7921.1(2) | 1859.0(3) | 9122.8(1) | 0.7 |
| V(1) | 6104.7(5) | 6360.8(7) | 10898.4(3) | 0.7 |
| P(1) | 9586.4(7) | 3712.4(11) | 11664.0(5) | 0.8 |
| O(1) | 7983(2) | 5020(4) | 11809(1) | 1.6 |
| O(2) | 10000(2) | 2064(3) | 12675(1) | 1.2 |
| O(3) | 6231(2) | 3862(3) | 9766(1) | 1.1 |
| O(4) | 9517(2) | 2291(4) | 10524(1) | 1.4 |
| O(5) | 11101(3) | 5348(4) | 11649(2) | 2.1 |
| O(6) | 6774(3) | 8757(4) | 10400(2) | 1.8 |

TABLE III

Interatomic Distances (Å)

| Sb(1)-O(3) | 1.959(2) |
|---|---|
| Sb(1)-O(4) | 2.008(2) |
| Sb(1)-O(5)a | 2.016(2) |
| Sb(1)-O(6)b | 2.523(2) |
| V(1)-O(1) | 1.933(2) |
| V(1)-O(2)d | 1.966(2) |
| V(1)-O(3)c | 1.974(2) |
| V(1)-O(3) | 1.947(2) |
| V(1)-O(6) | 1.595(2) |
| P(1)-O(1) | 1.504(2) |
| P(1)-O(2) | 1.521(2) |
| P(1)-O(4) | 1.547(2) |
| P(1)-O(5) | 1.532(2) |

TABLE IV

Intramolecular Angles (°)

| O(3)-Sb(1)-O(4) | 92.19(7) |
|---|---|
| O(3)-Sb(1)-O(5)a | 90.2(1) |
| O(3)-Sb(1)-O(6)b | 84.34(8) |
| O(4)-Sb(1)-O(5)a | 90.86(8) |
| O(4)-Sb(1)-O(6)b | 81.41(8) |
| O(5)a-Sb(1)-O(6)b | 170.3(1) |
| O(1)-V(1)-O(2)d | 90.12(8) |
| O(1)-V(1)-O(3)c | 149.90(9) |
| O(1)-V(1)-O(3) | 89.99(8) |
| O(1)-V(1)-O(6) | 105.7(1) |
| O(2)d-V(1)-O(3) | 139.65(8) |

TABLE IV-continued

Intramolecular Angles (°)

| | |
|---|---|
| O(2)d-V(1)-O(3)c | 82.63(7) |
| O(2)d-V(1)-O(6) | 108.0(1) |
| O(3)-V(1)-O(3)c | 77.43(8) |
| O(3)c-V(1)-O(6) | 104.3(1) |
| O(3)-V(1)-O(6) | 110.8(1) |
| O(1)-P(1)-O(2) | 111.4(1) |
| O(1)-P(1)-O(4) | 112.1(1) |
| O(1)-P(1)-O(5) | 112.2(1) |
| O(2)-P(1)-O(4) | 108.8(1) |
| O(2)-P(1)-O(5) | 105.0(1) |
| O(4)-P(1)-O(5) | 107.1(1) |
| Sb(1)-O(3)-V(1)c | 118.28(8) |
| Sb(1)-O(3)-V(1) | 139.03(9) |
| Sb(1)f-O(6)-V(1) | 164.1(1) |
| Sb(1)-O(4)-P(1) | 137.4(1) |
| Sb(1)a-O(5)-P(1) | 145.2(1) |
| V(1)-O(3)-V(1)c | 102.57(8) |
| V(1)-O(1)-P(1) | 140.7(1) |
| V(1)e-O(2)-P(1) | 133.3(1) |

TABLE V

Intermolecular Distances (Å)

| | |
|---|---|
| Sb(1)...P(1)a | 3.3892(8) |
| Sb(1)...O(2)g | 2.846(2) |
| Sb(1)...O(4)h | 3.147(2) |
| Sb(1)...O(5)g | 3.366(2) |
| V(1)...P(1)d | 3.207(1) |
| O(1)...O(1)d | 3.395(2) |
| O(1)...O(2)d | 2.760(3) |
| O(1)...O(6)e | 3.301(3) |
| O(2)...O(3)i | 2.601(2) |
| O(2)...O(5)j | 3.312(3) |
| O(2)...O(6)e | 2.889(3) |
| O(3)...O(5)a | 2.815(3) |
| O(3)...O(6)b | 3.038(3) |
| O(4)...O(4)h | 3.014(4) |
| O(4)...O(5)a | 2.867(3) |
| O(4)...O(6)a | 3.278(3) |
| O(4)...O(6)b | 2.981(3) |
| O(6)...O(6)k | 3.252(4) |

TABLE VI

Symmetry Operation Codes

| | |
|---|---|
| A | 2 − X, 1 − Y, 2 − Z |
| B | X, −1 + Y, Z |
| C | 1 − X, 1 − Y, 2 − Z |
| D | 3/2 − X, 1/2 + Y, 5/2 − -Z |
| E | 3/2 − X, −1/2 + Y, 5/2 − Z |
| F | X, 1 + Y, Z |
| G | −1/2 + X, 1/2 − Y, −1/2 + Z |
| H | 2 − X, −Y, 2 − -Z |
| I | 1/2 + X, 1/2 − Y, 1/2 + Z |
| J | 5/2 − X, −1/2 + Y, 5/2 − Z |
| K | 1 − X, 2 − Y, 2 − Z |

Figure 1:
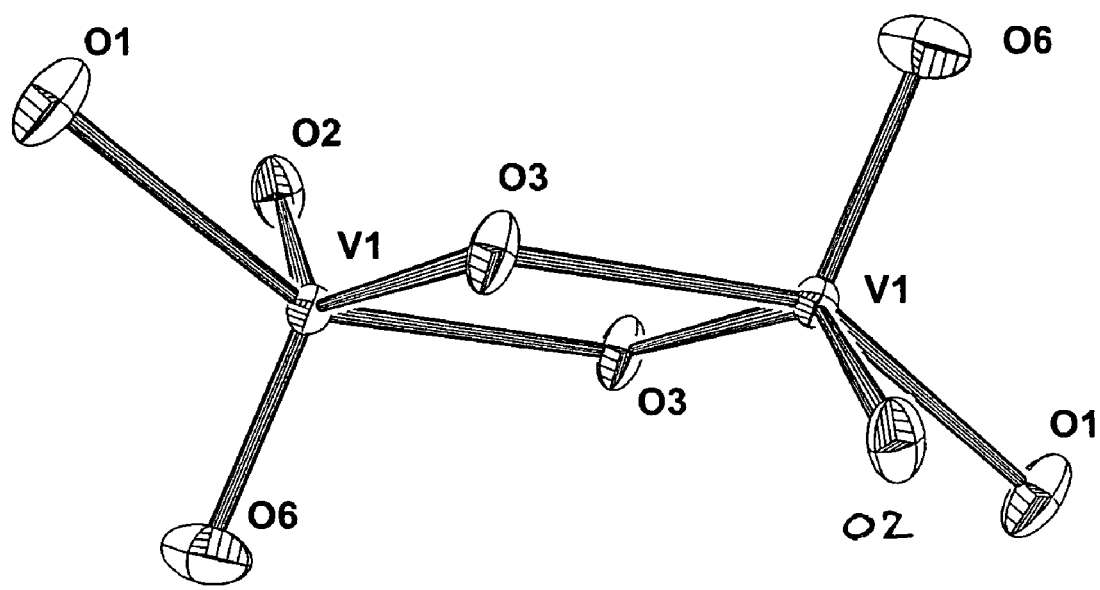
FIG. 1 illustrates a single $V_2O_8$ moiety as determined by X-ray analysis, with phosphate and antimony groups omitted for clarity.

The structure is composed of isolated $V_2O_8$ moieties which are similar to the $V_2O_{10}$ moieties in $(VO)_2P_2O_7$ except that they are missing the oxygen atoms trans to the vanadyl bonds (see FIG. 1). In $(VO)_2P_2O_7$, the long V—O bonds trans to the vanadyl bonds connect the $V_2O_{10}$ moieties in a ladder-like configuration. In the $SbVPO_6$ composition of this invention, the moieties are not connected directly but are instead connected via phosphate and $SbO_3$ groups.

There is space in the structure for an oxygen atom to form a bond to V trans to the short vanadyl bond. Accordingly, treatment of the material in air or oxygen at elevated temperatures would lead to increased oxygen capacity. Approximately 1.1 additional oxygen atoms can be rapidly added per formula unit by an initial heating in the presence of oxygen, such as but not limited to heating under an atmosphere of air or $O_2$, leading to a formula of $SbVPO_{6+\delta}$, wherein $\delta$ can be up to about 1.1. Higher levels may be further achievable using higher oxygen pressures and/or longer heating times. When all cations are fully oxidized, the compound produced would have a formula of $SbVPO_{7.5}$, in which case $\delta$ would be about 1.5 or up to about 1.5.

The compositions of this invention may be produced by various suitable methods, especially those used for preparing VPO-type materials. Some typical synthetic techniques, while not exhaustive, include without limitation fluxes, molten salts, hydrothermal, sealed tube, sol-gel, precipitation, and solid state, and certain of these are exemplified below. Starting materials may take any convenient form, such as oxides or thermally-degradable salts, e.g. acetate, ammonium, citrate, and/or nitrate compounds. Starting materials may, but need not necessarily be, mixed in stoichiometrically correct proportions. The atmosphere can be a mixture of air or oxygen and an inert gas (nitrogen, argon, helium and the like) in order to obtain the desired oxidation states. It may be desirable to limit the presence of oxygen when higher temperatures of preparation are used. The composition may be supported on a substrate such as alumina, silica, zirconia and the like to obtain higher surface area and/or to make a robust particle suitable for commercial uses.

Both antimony and vanadium in the compositions of the present invention have the potential to be further oxidized, and the crystal structure confirms that open sites exist for additional oxygen atoms. While the present invention is not bound by theory, it is believed that the higher level of oxygen in the present composition, as compared to traditional VPO catalysts, would enable the composition to function as a catalyst in many reactions, especially oxidations, and especially in oxidation reactions in which VPO catalysts have shown to be effective such as hydrocarbon oxidation reactions. Particularly suitable are oxidations of acyclic unsaturated hydrocarbons having from 4 to 10 carbon atoms in the presence of oxygen in which the composition of this invention is used in a catalytically effective amount, i.e. an amount suitable for achieving a catalytic effect. One such reaction is the oxidation of butadiene to furan. Other hydrocarbon oxidations, such as those using VPO catalysts and/or including furan production via butadiene oxidation, for which the composition of this invention would be useful as a catalyst include those described in the following sources: G. Centi, *J. of Mol. Catalysis*, 35 (1986), page 255; *Hydrocarbon Oxidation*, C. C. Hobbs, *Kirk-Othmer Encyclopedia of Chemical Technology*, John Wiley & Sons, Inc. (DOI:10.1002/0471238961.0825041808150202.a01, Dec. 4, 2000); *Maleic Anhydride, Maleic Acid and Fumaric Acid*, T. R. Felthouse, *Kirk-Othmer Encyclopedia of Chemical Technology*, John Wiley & Sons, Inc. (DOI:10.1002/0471238961.1301120506051229.a01.pub2, Oct. 18, 2001); U.S. Pat. No. 5,543,532; and U.S. Pat. No. 3,906,009.

The large potential redox capacity of $SbVPO_{6+\delta}$ ($0 \leq \delta \leq 1.5$) suggests it could make an effective catalyst for oxidation reactions as described above, especially a Mars-van Krevelen catalyst in which the catalyst cycles between an oxidized and reduced form and serves as the source of oxygen in an oxidation reaction. Reactions in which the composition of this invention would be useful as a Mars-van Krevelen catalyst include those described in *Basic Principles in Applied Catalysis*, Baerns, M. (ed.), 2004 Springer-Verlag, New York, pages 505-520.

The compositions of the present invention could be used as a catalyst in many types of reactor systems such as but not limited to pulse, fluidized bed, fixed bed, steady state riser reactor, transport bed reactor, and a recirculating solids reactor system, and could be supported on conventional catalytic solid supports.

The advantageous effects of this invention are demonstrated by a series of examples, as described below. The embodiments of the invention on which the examples are based are illustrative only, and do not limit the scope of the appended claims.

Materials and Methods

All chemicals were reagent-grade materials obtained from the Sigma-Aldrich Company. Single-crystal X-ray diffraction data were taken on an Enraf-Nonius CAD4 diffractometer using monochromatic Mo Kα radiation. Powder X-ray diffraction data were taken on a Siemens diffractometer using Cu Kα radiation. Thermogravimetric analyses were performed on a TA Instruments Hi-Res 2950 Thermogravimetric Analyzer.

EXAMPLE 1

Crystal Growth in an Antimony Oxide Flux 6.24 g $V_2O_4$, 4.67 g $P_2O_5$, and 17.42 g $Sb_2O_3$ were mixed well and put into a quartz tube. The tube was evacuated and sealed with a propane-oxygen torch and heated in a tube furnace in a vertical position. The furnace was heated 10°/minute to 900° C. and held at that temperature for 10 hours. The furnace was slowly cooled over 36 hours to 750° C. and then shut off. When cool, the tube was broken open, allowing the solidified melt to be broken up. Dark green crystals were isolated from the matrix and washed with water. The lattice parameters and crystal structure were determined by single-crystal X-ray diffraction. The composition, based on the crystal structure, was shown to be $SbVPO_6$. The lattice parameters and atomic positions are given in the tables above.

EXAMPLE 2

Hydrothermal Crystal Growth 3.62 g $Sb_2O_3$, 3.12 g $V_2O_4$, 4.7 g 85% $H_3PO_4$, 12.30 g $CH_3COOH$, and 48.26 g water were put into a 60 ml Teflon® fluoropolymer bottle. The bottle was shaken for several hours. The bottle was put into a shaker tube, and one-third of the void space was filled with water. The tube was sealed, and then heated to 300° C. for 7 days. The tube was shaken during the heat up, but not shaken after reaching 300° C. This synthesis yielded elongated diamond-shaped green crystals of $SbVPO_6$ and some residual $Sb_2O_3$. Single crystal X-ray diffraction confirmed that these crystals had the same lattice parameters and structure as those synthesized in Example 1.

EXAMPLE 3

Hydrothermal Crystal Growth

The synthesis in Example 2 was repeated, except with half the amount of $Sb_2O_3$, $V_2O_4$, and $H_3PO_4$. In this case, the crystals were larger with almost no residual $Sb_2O_3$.

EXAMPLE 4

Hydrothermal Crystal Growth $SbPO_4$ was first prepared in the following manner. 22.15 g $Sb_2O_3$, 68.25 g water, 40.05 g 85% $H_3PO_4$, and 54.90 g $CH_3COOH$ were put into a Teflon® fluoropolymer bottle and shaken well. The bottle was placed into a shaker tube, and one-third of the void space was filled with water. The tube was sealed and heated 48 hours at 275° C. while shaking. The resulting slurry was filtered, washed with water, and dried, yielding a white powder. X-ray powder diffraction confirmed that the product was $SbPO_4$, and showed no impurities.

2.50 g $SbPO_4$, 1.96 g $V_2O_4$, 15 g $H_2SO_4$, and 46.98 g water were put into a Teflon® fluoropolymer bottle. The bottle was placed into a rocker tube, and one-third of the void space was filled with water. The tube was then sealed and heated 2 days at 260° C. The tube was rocked only during heat up. Green crystals were isolated from the product. Single-crystal X-ray diffraction confirmed that these crystals were the same as those produced in Example 1.

EXAMPLE 5

Solid State Synthesis $SbPO_4$ (prepared as in Example 4) and $V_2O_4$ were mixed in a 2:1 molar ratio, ground well, and pressed into a pellet. The pellet was heated to 800° C. in flowing He for several hours. X-ray powder diffraction confirmed that the product was $SbVPO_6$.

EXAMPLE 6

Catalytic Activity

The pellet from Example 5 was crushed and sieved to 40-60 mesh. A sample of the granules was placed in a gas-phase reactor and exposed to flowing 1.07% butadiene/10.3% oxygen/balance Ar (% by volume). The products from the reactor were injected into a gas chromatograph equipped with a mass spectrometer for analysis. No significant catalytic activity was noted up to 400° C. A second sample of the granules was heated 10 hours in air at 500° C. These granules were tested in a similar fashion. Furan was produced at 300° C.

EXAMPLE 7

Thermogravimetric Analysis

A sample of the material made in Example 5 was crushed to a powder and used for thermogravimetric analysis. The sample was heated to 700° C. in air at 10° C./minute and increased approximately 6% in weight. A similar experiment in oxygen gave similar results. A weight increase of 5.3% corresponds to one oxygen atom per formula unit. X-ray powder diffraction confirmed that the phase did not decompose under these conditions.

What is claimed is:

1. A composition of the formula $SbVPO_{6+\delta}$ wherein $\delta$ is 0 to about 1.5, wherein $SbVPO_6$ is characterized by the data in Tables I and II, as follows:

TABLE I. Crystal Structure Parameters of $SbVPO_6$
Crystal System: Monoclinic
Lattice Parameters: a=7.999(2) Å, b=5.727(1) Å, c=11.566(3) Å, β=93.97(1)°
Volume: 528.57 Å$^3$ Formula: $SbVPO_6$
Units/Cell: 4
Formula Weight: 299.6 amu
Density: 3.76 g/cc
Space Group: $P2_1/n$.

TABLE II

Fractional Coordinates (×10000) and Isotropic Thermal Parameters

| ATOM | X | Y | Z | $B_{ISO}$ |
|---|---|---|---|---|
| Sb(1) | 7921.1(2) | 1859.0(3) | 9122.8(1) | 0.7 |
| V(1)  | 6104.7(5) | 6360.8(7) | 10898.4(3) | 0.7 |
| P(1)  | 9586.4(7) | 3712.4(11) | 11664.0(5) | 0.8 |
| O(1)  | 7983(2)   | 5020(4)   | 11809(1)  | 1.6 |
| O(2)  | 10000(2)  | 2064(3)   | 12675(1)  | 1.2 |
| O(3)  | 6231(2)   | 3862(3)   | 9766(1)   | 1.1 |
| O(4)  | 9517(2)   | 2291(4)   | 10524(1)  | 1.4 |
| O(5)  | 11101(3)  | 5348(4)   | 11649(2)  | 2.1 |
| O(6)  | 6774(3)   | 8757(4)   | 10400(2)  | 1.8. |

2. The composition of claim 1 wherein δ is 0 to about 1.1.

3. The composition of claim 1 wherein δ is 0.

4. The composition of claim 1 wherein $SbVPO_6$ is characterized by the X-ray data shown in Tables III-VI.

5. The composition of claim 1 wherein $SbVPO_6$ is characterized by the powder X-ray diffraction data shown in FIG 2.

6. An oxidation reaction comprising contacting a substance to be oxidized with the composition of claim 1 to produce an oxidized substance.

7. The process of claim 6 wherein, in the composition, δ is greater than 0.

8. The process of claim 6 wherein the substance to be oxidized is an acyclic unsaturated hydrocarbon having from 4 to 10 carbon atoms.

9. The process of claim 6 wherein the process is conducted in the presence of oxygen.

10. The process of claim 6 wherein the substance to be oxidized is butadiene and the oxidized substance is furan.

11. A process for preparing an oxidized antimony vanadium phosphate composition comprising heating a starting composition of the formula $SbVPO_6$ in the presence of oxygen to produce a composition of the formula $SbVPO_{6+\delta}$ wherein δ is 0 to about 1.5, wherein the starting composition of the formula $SbVPO_6$ is characterized by the data in Tables I and II, as follows:

TABLE I. Crystal Structure Parameters of $SbVPO_6$

Crystal System: Monoclinic
Lattice Parameters: a=7.999(2) Å, b=5.727(1) Å, c=11.566(3) Å, β=93.97(1)°
Volume: 528.57 Å$^3$
Formula: $SbVPO_6$
Units/Cell: 4
Formula Weight: 299.6 amu
Density: 3.76 g/cc
Space Group: $P2_1/n$.

TABLE II

Fractional Coordinates (×10000) and Isotropic Thermal Parameters

| ATOM | X | Y | Z | $B_{ISO}$ |
|---|---|---|---|---|
| Sb(1) | 7921.1(2) | 1859.0(3) | 9122.8(1) | 0.7 |
| V(1)  | 6104.7(5) | 6360.8(7) | 10898.4(3) | 0.7 |
| P(1)  | 9586.4(7) | 3712.4(11) | 11664.0(5) | 0.8 |
| O(1)  | 7983(2)   | 5020(4)   | 11809(1)  | 1.6 |
| O(2)  | 10000(2)  | 2064(3)   | 12675(1)  | 1.2 |
| O(3)  | 6231(2)   | 3862(3)   | 9766(1)   | 1.1 |
| O(4)  | 9517(2)   | 2291(4)   | 10524(1)  | 1.4 |
| O(5)  | 11101(3)  | 5348(4)   | 11649(2)  | 2.1 |
| O(6)  | 6774(3)   | 8757(4)   | 10400(2)  | 1.8. |

12. The process of claim 11 wherein δ is greater than 0 to about 1.1.

13. The process of claim 11 wherein the starting composition of the formula $SbVPO_6$ is characterized by the X-ray data shown in Tables III-VI.

14. The process of claim 11 wherein the starting composition of the formula $SbVPO_6$ is characterized by the powder X-ray diffraction data shown in FIG 2.

* * * * *